United States Patent Office 3,767,822
Patented Oct. 23, 1973

3,767,822
BAKERY PRODUCTS CONTAINING POLYOXY-ALKYLENE DERIVATIVES OF PROPYLENE GLYCOL HIGHER FATTY ACID ESTERS
Antal G. Oszlanyi, Brook Park, Richard J. Zielinski, Middleburg Heights, and Thomas J. Kozak, Parma Heights, Ohio, assignors to SCM Corporation, Cleveland, Ohio
No Drawing. Filed Oct. 22, 1970, Ser. No. 83,195
Int. Cl. A21d 2/16
U.S. Cl. 426—24                        6 Claims

ABSTRACT OF THE DISCLOSURE

Yeast-raised bakery products having improved properties are produced by excluding as a portion of the dough conditioner therefor a polyoxyalkylene derivative of a higher fatty acid ester of propylene glycol.

---

Dough conditioners for yeast-raised bakery products have been widely utilized especially in continuous processes for making bread. The dough conditioner primarily acts to increase the shock tolerance of such yeast-raised bakery products, thus preventing collapse on sudden impact.

Other additives having dough conditioning properties have been widely used in bakery goods to retard staling, to improve texture and to improve the specific volume of the finished bakery products.

Monoglycerides, for example, have been widely used in bakery goods as they enhance eating qualities by prolonging flavor freshness, impart fine uniform cellular structure to the bakery product, improve texture, and aid in providing prolonged compressibility (softness).

Ethoxylated monoglycerides have also been used as a dough conditioning additive for some of the same reasons as monoglycerides as they improve many of the properties desired in bakery products. This use is shown in U.S. Pat. 3,433,645.

It has been found that yeast-raised bakery products, e.g., rolls, bread, yeast sweet goods, etc. containing from 0.05–1% of a dough conditioner basis weight of the flour can be improved by including as a portion of said dough conditioner a polyoxyalkylene derivative of a propylene glycol higher fatty acid ester.

The advantages of the process and product include: improved specific volume of the finished bakery product, desirable shock tolerance for the unproofed, unbaked product, and desirable anti-staling properties.

By a polyoxyalkylene derivative of propylene glycol higher fatty acid esters I refer to ethylene or propylene oxide condensation products of the propylene glycol esters. Although propylene oxide can be employed in forming the condensation product, it often is not used for reasons of efficiency and economy. Generally not more than 20% propylene oxide by weight of ethylene oxide, and preferably none, is used, this latter product, i.e., containing solely ethylene oxide, is referred to as the polyoxyethylene derivative of a propylene glycol higher fatty acid ester.

The polyoxyalkylene derivatives of propylene glycol higher fatty acid esters can be prepared in several ways. One of the ways of preparing the polyoxyalkylene derivatives is to react ethylene oxide with propylene glycol in desired proportions, then esterify the resultant condensation product with a fatty acid, fatty acid halide, or glyceride, e.g., mono, di or triglycerides (I). Another method contemplates reacting a propylene glycol mono-ester with ethylene oxide (II). No esterification reaction is needed since the ester portion is provided by the propylene glycol mono-ester. In both reactions an alkaline catalyst, e.g., sodium hydroxide, potassium hydroxide, etc. normally is used. Specific reactions for making the polyoxyethylene derivatives of propylene glycol higher fatty acid esters are represented by the formulas illustrated below:

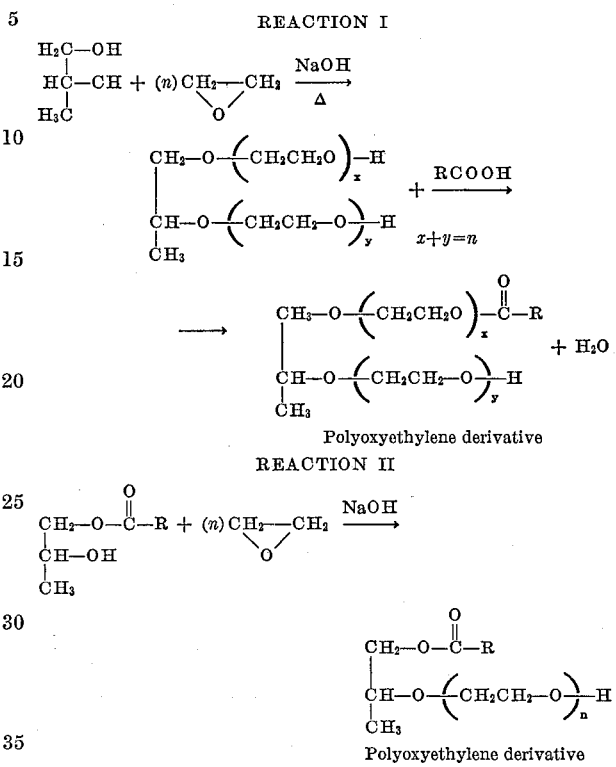

In the above formulas, R represents a fatty acid radical, ($n$) is a number between about 10–60, and $x$ and $y$ are numbers from 0–60, the sum of which is equal to ($n$). Of course the above formulas are theoretical and it is to be understood that pure products seldom are produced by such reactions. Ofter the reaction product can contain slight amounts of unreacted propylene glycol, mono and di-esters of propylene glycol, polyethylene glycols, etc. But the major proportion of the reaction product is a polyoxyethylene derivative of a propylene glycol higher fatty acid ester.

The polyoxyalkylene derivatives of propylene glycol higher fatty acid esters should be, for preferred results, the mono-esters although some di-ester may be present. Typical analysis includes the following: hydroxyl number should be between about 40–80; ester number between about 40–80; and acid number of not substantially more than 2.0 maximum, generally between about 0.4–1.

In the reaction where ethylene oxide is reacted with propylene glycol or with the ester thereof, the molar proportion of ethylene oxide in the ester typically is between about 10–60 moles ethylene oxide per mole of propylene glycol and, for reasons of efficiency and economy, the molar proportion should be at least 18 moles ethylene oxide per mole of propylene glycol or the ester thereof and usually not more than 35.

Propylene glycol mono-esters can be synthesized in a variety of ways; one method contemplates reacting a triglyceride with propylene glycol, either 1–3 or 1–2 propylene glycol, in the presence of an alkaline catalyst; another contemplates reacting propylene oxide with a fatty acid or by reacting propylene glycol with a fatty acid.

The ester portion of the polyoxyalkylene derivative of propylene glycol is supplied by a fatty acid or fatty acid radical-supplying material, e.g., a glyceride. By a higher fatty acid ester it is meant those esters where the fatty acid radical portion has between about 12–22 carbon atoms in the structure. The fatty acid can be saturated or unsaturated and typically is derived from oleic acid, stearic acid, behenic acid, palmitic acid, and others well known in the art.

In making the yeast-raised bakery products the dough conditioners is usually included in an amount of from about 0.05–1% by weight of the flour content. Preferably for making bread the level of dough conditioner is maintained between about 0.1–0.5% basic weight of the flour. Often when the levels of dough conditioner fall below or above the levels set forth, the quality of the product diminishes.

It has been found that excellent results are obtained in the making of bread by the sponge-dough process, straight dough process, and by the continuous process, all processes being known to those skilled in the art. Such processes are described in U.S. Pat. 3,433,645, and such processes are incorporated by reference. Although the sponge-dough process is the most widely used at the present time, the continuous process, because of its economic advantages, is gaining wide acceptance.

The sponge-dough method for preparing bread involves the preparation of two distinct mixtures, the sponge and the dough. The ingredients for the two mixtures are illustrated in Table I.

TABLE I

| Sponge ingredients: | Parts |
|---|---|
| Flour | 65 |
| Water | 37.2 |
| Yeast | 2.5 |
| Yeast food | 0.5 |
| Dough ingredients: | |
| Flour | 35 |
| Sugar | 8 |
| Salt | 2 |
| Shortening (e.g., lard) | 3 |
| Non-fat milk product | 6 |
| Water | 28 |
| Dough conditioner | 0.5 |

In the sponge-dough process, the sponge is prepared by first mixing the yeast and yeast food in the sponge water. The resultant yeast solution is added to the flour and blended for approximately four minutes until thoroughly mixed. The sponge then is allowed to ferment at a temperature of 86° F. and relative humidity of 75° for about 4½ hours. After fermentation, the sponge mixture is returned to the mixer with the dough ingredients and mixed for approximately 10–12 minutes. After the mixing, the resultant dough is allowed to rest for about 18–20 minutes. The dough is separated, shaped and placed in loaf pans for proofing and baking, baking usually requiring about 25 minutes at a temperature of 425° F.

The continuous process involves the preparation of brew or liquid sponge from the ingredients described in Table II. The liquid sponge or brew contains the salt, yeast, sugar, milk, water and from 0–70% of the flour and is fermented for approximately 2–2½ hours. After fermentation, the brew, shortening oxidants and the remainder of the flour are metered to a premixer and combined.

TABLE II

| Ingredients: | Parts |
|---|---|
| Flour | 100 |
| Water | 66 |
| Salt | 2 |
| Yeast | 2.5 |
| Sugar | 8 |
| Non-fat milk product | 3.5 |
| Shortening | 2.5 |
| Dough conditioner | 0.5 |
| Oxidants (e.g., potassium bromate, potassium iodate) | [1] 75 |

[1] P.p.m. (max.) based on flour weight.

All of the ingredients are fed from the premixer continuously into a developer head and mixed to form a continuous dough mass. The developer employed in the continuous process is hydrostatically full, with no gas-filled space, and operated at a pressure of 50–60 pounds. The dough then is continuously extruded, cut off and deposited in baking pans for proofing and baking.

The straight dough process encompasses the fermenting of all the ingredients, after mixing, as listed in Table III for approximately two hours. After fermentation the dough is separated, shaped, placed in pans, proofed and baked.

TABLE III

| Ingredients: | Parts |
|---|---|
| Flour | 100 |
| Water | 67 |
| Sugar | 5 |
| Salt | 2 |
| Yeast | 3 |
| Non-fat milk product | 4 |
| Shortening | 3 |
| Dough conditioner | 0.5 |
| Yeast food | 0.5 |

In the straight dough process, the ingredients set forth in Table III are charged to a vessel and mixed until thoroughly blended. The blended ingredients then are allowed to ferment for approximately two hours. After fermentation the dough is separated, shaped, placed into bread pans, proofed and baked at a temperature of about 425° F. for 25 minutes.

Other additives in conjunction with the polyoxyalkylene derivative of propylene glycol higher fatty acid esters can be employed in making the yeast-raised bakery products. Suitable additives include those conventionally used for making yeast-raised bakery goods, e.g., alpha-monoglyceride and diglycerides, calcium stearoyl-2-lactylate, propylene glycol mono-esters, e.g., propylene glycol lactostearate, propylene glycol monostearate, ethoxylated monoglyceride, and the like. It has been found that excellent results are obtained when the polyoxyethylene derivative of propylene glycol mono-esters is combined with alpha-monoglyceride in a ratio of from about 40 parts polyoxyethylene derivative of propylene glycol monoesters:60 parts alpha-monoglyceride to about 60 parts polyoxyethylene derivative of propylene glycol mono-esters:40 parts alpha-monoglyceride.

Although the other additives can be incorporated into the dough conditioner set forth, it is preferred that at least 40% of the dough conditioner comprise the polyoxyalkylene derivative of a propylene glycol higher fatty acid ester and preferably at least 80% and above, except where the polyoxyalkylene derivative is combined with the alpha-monoglyceride. Then the proportions as set forth in the ranges before stated are preferred.

The following specific examples are provided to illustrate preferred embodiments of the invention but are not intended to limit the scope thereof. All parts are parts by weight, all percentages are weight percentages, and all degrees are degrees Fahrenheit, unless otherwise specified.

EXAMPLE 1

Preparation of ethoxylated propylene glycol monostearate

One mole of stripped propylene glycol monostearate prepared by reacting one mole tallow, stearine 5½ moles propylene glycol and 0.03 mole sodium hydroxide is charged to a reaction vessel and melted by heating to a temperature of 320° F. A dry nitrogen gas sweep is passed through the propylene glycol monostearate for about 5 minutes to remove substantially all traces of water and oxygen. After removal of the water and oxygen, 20 moles ethylene oxide are charged to the vessel at a rate to maintain the pressure in the vessel between 40–60 p.s.i.g. The ethoxylation reaction is allowed to proceed for a period from about 8–10 hours at a temperature between 320–

340° F. as specified. The ethoxylation reaction is catalyzed by the presence of the sodium hydroxide. At the completion of the reaction, the product is cooled to room temperature (70° F.) and neutralized with phosphoric acid.

This product, referred to as Dough Conditioner B, has a hydroxyl number of 56, a saponification number of 53, an ester number of 53, polyoxyethylene content of 70.04% by weight, and a Capillary Melting Point of 85.9° F. Theoretically, the 20 moles ethylene oxide are reacted with one mole of the propylene glycol monostearate composition.

A like polyoxyethylene propylene glycol monostearate product, referred to as Dough Conditioner A, is prepared in the manner as set forth above, except that 10 moles ethylene oxide are reacted with one mole propylene glycol monostearate composition. The acid number of this product is 0.3, the hydroxyl number 79.2, saponification number 74, ester number of 73.7, and a Capillary Melting Point of 78.7° F.

A like polyoxyethylene derivative of propylene glycol monostearate, referred to as Dough Conditioner C, is prepared as above, except that 30 moles ethylene oxide are reacted with one mole propylene glycol monostearate composition. The product has a hydroxyl number of 48.4, saponification number of 44.3, ester number of 44, and a Capillary Melting Point of 93.4° F.

EXAMPLE 2

A polyoxyethylene derivative of propylene glycol monostearate is prepared as follows: one mole of propylene glycol and 1/200 mole potassium hydroxide are charged to a reaction vessel and heated to a temperature of 340° F. Then 20 moles of ethylene oxide are charged to the vessel for reaction with the propylene glycol. The reaction takes about 6–8 hours for completion. After the reaction is completed, the product is cooled to a temperature of 250° F. Then one mole of stearic acid is charged to the vessel and the contents heated to 400° F. The reaction is discontinued when the acid value reaches two or lower.

EXAMPLE 3

Bread loaves made by the continuous process are prepared with the dough conditioners of Example 1 for comparison against a bread loaf employing a commercial ethoxylated monoglyceride dough conditioner also made by such process. The basic bread formulation is as follows:

Ingredients: Parts
- Flour —————————————————————— 100
- Water —————————————————————— 66
- Salt ——————————————————————— 2
- Sugar —————————————————————— 4
- Shortening (unemulsified) ——————— 2.5
- Milk powder ——————————————————— 5
- Yeast ——————————————————————— 1.5
- Dough conditioner ——————————————— 0.5
- Oxidants (e.g., potassium bromate) ———— [1] 75

[1] P.p.m. (based on flour weight.)

The resulting bread loaves are evaluated for (a) specific volume in terms of cubic centimeters/gram of bread, the higher the specific volume the more desirable the bread; (b) shock loss, which is a measurement of the percentage loss in specific volume when a proofed, unbaked loaf of bread is allowed to slide down a 3-foot roller conveyor tilted at a angle of 16.5° to the horizontal plane and collide with stopper at the bottom of the conveyor. Proofing bread refers to the process wherein unbaked bread is allowed to stand for one hour at 100° F., relative humidity of 85–100%, and rise. The lower the percentage of shock loss the more desirable is the bread; (c) antistaling, which is the energy in inch-grams required to depress the crumb of a baked loaf of bread ½" after 5 days storage at 72° F. and 50% relative humidity, the lower the anti-staling number the softer and more desirable the bread; and (d) bread score. Bread score is an overall evaluation of the baked loaf of bread wherein a number is assigned to the bread, with 100 being a perfect score, 80 or lower being unacceptable, 90 being good to excellent. In determining the bread score, consideration is given to the texture of the bread, cellular structure of the crumb (uniformity), break and shred, flavor, odor, taste, volume in cc./gram, and color.

Table IV below represents the data obtained by such testing:

TABLE IV

| Bread | Specific vol., cc./cm. | Shock loss, percent | Bread score | Anti-staling, gm. |
|---|---|---|---|---|
| Dough Conditioner: | | | | |
| A—Example 1 | 7.08 | 6.5 | 88 | 32.87 |
| B—Example 1 | 7.18 | 3.9 | 90 | 33.68 |
| C—Example 1 | 7.17 | 5.0 | 90 | 31.51 |
| Ethoxylated monoglyceride dough conditioner | 6.89 | 4.5 | 87 | 35.46 |

Thus from the above table, it can be seen that breads having as the dough conditioner the polyoxyethylene derivative of propylene glycol monostearate have a higher specific volume, a higher bread score and lower anti-staling values than breads employing ethoxylated monoglycerides. No substantial differentiation in shock resistance is noticed.

EXAMPLE 4

A bread of the formulation as set forth in Example 3 is prepared, except that the dough conditioner is a 50–50 mixture by weight of Dough Conditioner B of Example 1 and a commercial monoglyceride having 50% alpha-monoglyceride content. The resultant bread tested excellently when tested for specific volume, percentage shock loss, bread score and anti-staling properties.

We claim:

1. In the preparation of yeast-raised bakery goods wherein flour, water and yeast, and a dough conditioner in an amount from 0.05–1 weight percent based on the flour are combined into a dough which is subsequently baked the improvement which comprises: including as at least 40% by weight of said dough conditioner a polyoxyalkylene derivative of a propylene glycol higher fatty acid ester, said polyoxyalkylene derivative having 10–60 alkylene oxide units per one mole of propylene glycol, said alkylene oxide units being a mixture of 80–100 percent by weight ethylene oxide units and 0–20 percent by weight propylene oxide.

2. The process of claim 1 wherein said dough conditioner is present in an amount of from 0.1–0.5 weight percent based on the flour content.

3. The process of claim 1 wherein said dough conditioner is the polyoxyethylene derivative of a propylene glycol higher fatty acid ester, with polyoxyethylene moiety consisting essentially of 10–30 ethylene oxide units.

4. The process of claim 1 wherein said yeast-raised bakery goods are prepared according to the sponge-dough process.

5. The process of claim 1 wherein said yeast-raised bakery goods are prepared according to the continuous process.

6. The process of claim 1 wherein said yeast-raised bakery goods are prepared according to the straight dough process.

References Cited

UNITED STATES PATENTS

| | | | |
|---|---|---|---|
| 3,433,645 | 3/1969 | Egan et al. | 99—91 X |
| 3,453,116 | 7/1969 | Freund | 99—91 X |

RAYMOND N. JONES, Primary Examiner

J. R. HOFFMAN, Assistant Examiner

PO-1050
(5/69)

UNITED STATES PATENT OFFICE
CERTIFICATE OF CORRECTION

Patent No. 3,767,822          Dated October 23, 1973

Inventor(s) Antal G. Oszlanyi, Richard J. Zielinski, and Thomas J. Kozak

It is certified that error appears in the above-identified patent and that said Letters Patent are hereby corrected as shown below:

Column 1, line 16, in the Abstract cancel "excluding" and insert "including" therefor.

Column 3, line 47, correct "75°" to read "75%".

Column 4, line 65, the comma "," should be after stearine.

Column 5, line 68, the "a" after "at" should be "an".

Column 6, Table IV, the unit in Anti-staling column should be "in-gm.".

Signed and sealed this 9th day of April 1974.

(SEAL)
Attest:

EDWARD M. FLETCHER, JR.          C. MARSHALL DANN
Attesting Officer          Commissioner of Patents